United States Patent [19]
Kaku et al.

[11] Patent Number: 6,044,109
[45] Date of Patent: Mar. 28, 2000

[54] MODEM SIGNAL TRANSMITTER, MODEM SIGNAL TRANSMITTING METHOD, MODEM SIGNAL RECEIVER, MODEM SIGNAL RECEIVING METHOD, MODEM SIGNAL TRANSMITTING/RECEIVING SYSTEM AND MODEM SIGNAL TRANSMITTING/RECEIVING METHOD

[75] Inventors: Takashi Kaku; Ryoji Okita, both of Kawasaki, Japan

[73] Assignee: Fujitsu Limited, Kanagawa, Japan

[21] Appl. No.: 08/833,260

[22] Filed: Apr. 4, 1997

[30] Foreign Application Priority Data

Apr. 5, 1996 [JP] Japan ................................. 8-084312

[51] Int. Cl.⁷ ..................................................... H04B 1/38
[52] U.S. Cl. ......................... 375/223; 375/265; 375/298; 375/322; 375/211; 329/304; 332/103; 370/493
[58] Field of Search ..................................... 375/222, 211, 375/223, 265, 298, 322; 370/321, 347, 493, 434, 433, 435; 332/103; 329/304

[56] References Cited

U.S. PATENT DOCUMENTS

| | | | |
|---|---|---|---|
| 5,214,656 | 5/1993 | Chung et al. | 375/261 |
| 5,448,555 | 9/1995 | Bremer et al. | 370/206 |
| 5,537,441 | 7/1996 | Bremer et al. | 375/261 |
| 5,710,754 | 1/1998 | Kaku et al. | 370/207 |
| 5,892,757 | 4/1999 | Norrell et al. | 370/292 |

FOREIGN PATENT DOCUMENTS

| | | |
|---|---|---|
| 0631421 | 12/1994 | European Pat. Off. . |
| 0653872 | 5/1995 | European Pat. Off. . |
| 60144037 | 7/1985 | Japan . |
| 06169360 | 6/1994 | Japan . |
| 6-169360 | 6/1994 | Japan . |
| WO9310623 | 5/1993 | WIPO . |
| WO9316537 | 8/1993 | WIPO . |

Primary Examiner—Stephen Chin
Assistant Examiner—Lenny Jiang
Attorney, Agent, or Firm—Helfgott & Karas, P.C.

[57] ABSTRACT

In a modem signal transmitting/receiving system which includes a modem signal transmitter and a modem signal receiver connected to each other via a transmission line, a modem signal transmitter is suitable to transmit by multiplexing an analog signal such as audio and a modem carrier with digital data. Analog signals and digital data can be multiplex-transmitted at a high rate by effectively using an analog signal line. The modem signal transmitter includes a modem transmitting unit, an analog/digital converting unit which converts an analog signal into a digital signal, a demodulating unit which demodulates the digital signal with a predetermined carrier frequency signal, a decimation processing filter which decimates the demodulated signal and a deciding unit which decides a coordinate on a two-dimensional plane for the output from the decimation processing filter and then inputs the decision result to the modem transmitting unit. The signal received from the transmission line is subjected to an interpolation process, modulated with a predetermined carrier frequency, converted to an analog signal and outputted to the analog signal line.

18 Claims, 12 Drawing Sheets

PRINCIPLE BLOCK DIAGRAM OF THE PRESENT INVENTION

PRINCIPLE BLOCK DIAGRAM OF THE PRESENT INVENTION

BLOCK DIAGRAM SHOWING THE MAIN PORTION OF THE TRANSMITTING UNIT IN A MODEM ACCORDING TO AN EMBODIMENT OF THE PRESENT INVENTION

BLOCK DIAGRAM SHOWING THE MAIN PORTION OF THE RECEIVING UNIT IN A MODEM ACCORDING TO AN EMBODIMENT OF THE PRESENT INVENTION

FLOWCHART USED FOR EXPLAINING A SIGNAL POINT DECISION ASPECT OF A SIGNAL POINT DECIDING UNIT ACCORDING TO AN EMBODIMENT OF THE PRESENT INVENTION

DIAGRAM SHOWING A DECISION SURFACE INCLUDED IN THE SIGNAL POINT DECIDING UNIT ACCORDING TO AN EMBODIMENT OF THE PRESENT INVENTION

DIAGRAM SHOWING A DECISION SURFACE INCLUDED IN THE SIGNAL POINT DECIDING UNIT ACCORDING TO AN EMBODIMENT OF THE PRESENT INVENTION

--- : BOUNDARY OF EACH DECISION POINT
↔ : SPACE BETWEEN DECISION POINTS (EQUAL DISTANCE)

DIAGRAM USED FOR EXPLAINING A SIGNAL POINT DECISION ASPECT OF THE SIGNAL POINT DECIDING UNIT ACCORDING TO AN EMBODIMENT OF THE PRESENT INVENTION

DIAGRAM USED FOR EXPLAINING A SIGNAL POINT DECISION ASPECT OF THE SIGNAL POINT DECIDING UNIT ACCORDING TO AN EMBODIMENT OF THE PRESENT INVENTION

BLOCK DIAGRAM SHOWING A PRIOR ART SIGNAL TRANSMITTING SYSTEM

DIAGRAM SHOWING THE OPERATION OF A PRIOR ART SIGNAL TRANSMITTING SYSTEM

MODEM SIGNAL TRANSMITTER, MODEM SIGNAL TRANSMITTING METHOD, MODEM SIGNAL RECEIVER, MODEM SIGNAL RECEIVING METHOD, MODEM SIGNAL TRANSMITTING/RECEIVING SYSTEM AND MODEM SIGNAL TRANSMITTING/RECEIVING METHOD

BACKGROUND OF THE INVENTION

1. Technical Field of the Invention

The present invention relates to a modem signal transmitting/receiving system, a modem signal transmitter, a modem signal transmitting method, a modem signal receiver and a modem signal receiving method, each suitable for transmitting and receiving analog signals such as audio, carriers for modems and digital data in a multiplex mode.

2. Description of the Prior Art

Recently, a variety of transmission media have enabled various signals including data signals and image signals to be transmitted via analog lines, in addition to telephone (audio signals) and FAX signals.

Generally, analog signals output from a telephone terminal or the like are directly transmitted via an analog line, without converting signals by means of a modem. However, when a data terminal that transmits and receives digital data is connected to an analog line, a modem is inserted.

That is, a transmission side modem performs a signal conversion for digital signals such as FAX signals from a FAX terminal, data signals output from a data terminal or image signals and then transmits the result in the form of an analog signal via an analog line. A receiving side modem performs a signal conversion inversely to that of the transmission side modem and then receives the result in the form of a digital signal at its data terminal.

Usually, the terminal such as the telephone terminal that transmits and receives analog signals and the data terminal that transmits and receives digital data use different lines to transmit information. However, when lines connected via dedicated lines are specially used, it is desired that analog terminal and the digital terminal can use the same line because of a demand for the reduced line use charge.

In contrast, Japanese Patent Laid-Open Publication (Tokkai-Hei) No. 6-169360, as shown in FIG. 11, discloses the technique in which data terminals, telephone terminals or the like can establish communications using a single analog line 112 via a modem by multiplex transmitting digital data from the data terminal with analog signals from telephone terminals.

In the multimedia multiplex transmitting system shown in FIG. 11, on the transmitting side, an encoding unit 101 converts digital data into a data signal point through its encoding process and a base band converting unit 102 converts an audio signal as an analog passband signal into a digital signal and then converts the result into a baseband signal.

In such operation, as shown in FIG. 12, by adding the baseband signal converted by the baseband converting unit 102 with encoding data from the encoding unit 101 by means of an adding unit 103 and then modulating and transmitting the result by means of the modulating unit 104, a baseband signal component (analog signal component) 110 can be convoluted to a data signal point (digital data component) 111 and then the result is transmitted.

On the receiving side, a demodulating unit 105, an equalizing unit 106 and a deciding unit 107 subject the modulated signal sent from the transmission side to demodulation, equalization and signal point deciding process, respectively, and then subject the result to a code conversion, thereby reproducing reception data.

On the other hand, a differential arithmetic unit 108 processes the difference between the output before a signal point decision and the output after the signal point decision in the deciding unit 107 and then outputs an audio baseband signal. After converting an audio baseband signal into a passband signal, a passband converting unit 109 converts it into an analog signal, thus outputting the audio signal as an analog passband signal.

In order to multiplex an analog signal with digital data, analog signals are compressed by means of a technique suitable for audio (a technique based on the characteristics of audio data) and then transmitted.

However, in the technique of multiplexing an analog signal with digital data, as shown in FIG. 11, when the technique is applied to a high-speed data transmitting system, the space between signal points is narrowed. Hence, when an analog signal component is convoluted at a data signal point acting as a digital data component and then transmitted, it is difficult to perform a signal point decision with high accuracy because of the convoluted analog signal component, whereby errors may occur.

The problem is that when analog signals which are subjected to compression suitable for audio are transmitted, analog signals other than audio signals to be transmitted such as FAX signals cannot be effectively compressed. The transmitter's decimation processing filter converts a sampling rate, into a symbol rate for the demodulating signal from the demodulating unit. Further, it is difficult to transmit particularly a digital data modulating carrier such as a FAX signal (9600 bps).

The present invention is made to overcome the above-mentioned problems.

SUMMARY OF THE INVENTION

It is an object of the present invention to provide a modem signal transmitter, a modem signal transmitting method, a modem signal receiver, a modem signal receiving method, a modem signal transmitting/receiving system and a modem signal transmitting/receiving method each of which can multiplex transmit analog signals and digital data at high speed by effectively using an analog line.

This and other objects of the present invention are attained by a modem signal transmitter having a modem transmitting unit and comprising an analog/digital converting unit for converting an analog signal into a digital signal; a demodulating unit for demodulating said digital signal converted in said analog/digital converting unit with a predetermined carrier frequency signal; a decimation processing filter for subjecting the demodulated signal from said demodulating unit to a decimation process; and a deciding unit for subjecting the output from said decimation processing filter to a coordinate decision a two-dimensional plane and then inputting the decision result to said modem transmitting unit.

According to another aspect of the invention, a modem signal transmitting method is suggested for a modem transmitting unit, the method comprising an analog/digital converting step for converting an analog signal into a digital signal; a demodulating step for demodulating said digital signal converted in said analog/digital converting step at a predetermined carrier frequency signal; a decimation processing step for subjecting the demodulated signal obtained in said demodulating step to a decimation process; a deciding step for subjecting the decrimation process signal obtained in said decimation processing step to a coordinate decision on a two-dimensional plane and then inputting the decision result to said modem transmitting unit; and a transmitting step for subjecting a decision information obtained in said deciding step to a modem transmitting process and then transmitting the result as a modem signal.

According to yet another aspect of the invention a modem signal transmitting method is provided for a modem signal transmitting unit, which comprises the steps of deciding a coordinate on a two-dimensional plane after an analog signal has been demodulated, and then inputting a decision result as digital data to said modem transmitting unit in a modem signal transmitter including a modem transmitting unit; and multiplexing time-divisionally the digital data with another digital signal in said modem transmitting unit and then transmitting the result.

The objects of the present invention are also achieved by a modem signal receiver including a modem receiving unit that receives a signal having information which is subjected to a coordinate decision on a two-dimensional plane which signal is demodulated with a predetermined carrier frequency signal and then subjected to a decimation process, the modem signal receiver comprising an interpolation processing filter for performing an interpolation process corresponding to said decimation process to the digital signal from said modem receiving unit; a modulating unit for modulating the output from said interpolation processing filter with said carrier frequency signal; and a digital/analog converting unit for converting said digital signal modulated by said modulating unit into an analog signal.

The interpolation processing filter of the receiver converts a symbol rate to a sampling rate for the digital signal from the modem receiving unit.

The objects of the present invention are also attained by a modem receiving method which comprises a receiving step for receiving a signal having information that is subjected to a coordinate decision on a two-dimensional plane which signal is demodulated with a predetermined carrier frequency signal and then subjected to a decimation process; an interpolation processing step for performing an interpolation process corresponding to said decimation process to the signal having information which is subjected to said coordinate decision received in said receiving step; a modulating step for modulating the interpolation processing signal obtained in said interpolation processing step with said carrier frequency signal; and a digital/analog converting step for converting said digital signal modulated in said modulating step into an analog signal.

The objects of the present invention are also achieved by a a modem signal transmitting/receiving system comprising a modem signal transmitter and a modem signal receiver connected via a transmission line; wherein said modem signal transmitter includes an analog/digital converting unit for converting an analog signal into a digital signal; a demodulating unit for demodulating the digital signal converted by said analog/digital converting unit with a predetermined carrier frequency signal; a decimation processing filter for subjecting the demodulated signal from said demodulating unit to a decimation process; a deciding unit for subjecting an output from said decimation processing filter to a coordinate decision on a two-dimensional plane and then outputting a decision result; and a modem transmitting unit for subjecting an outcome to a modem process, the outcome being obtained by time-divisionally multiplexing said decision result from said deciding unit with other digital signal, and then transmitting the processed result as a modem signal; and wherein said modem signal receiver includes a modem receiving unit for subjecting said another digital signal transmitted from said modem transmitting unit of said modem signal transmitter via said transmission line and the signal having information regarding said coordinate decision, to an inverse modem process and then separating both signals from each other; an interpolation processing filter for subjecting a signal having information regarding said coordinate decision from said modem receiving unit to an interpolation process corresponding to said decimation process; a modulating unit for modulating the output from said interpolation processing filter with said carrier frequency signal; and a digital/analog converting unit for converting the digital signal modulated by said modulating unit into an analog signal.

DETAILED DESCRIPTION OF THE PREFERRED EMBODIMENTS

Figure 1:
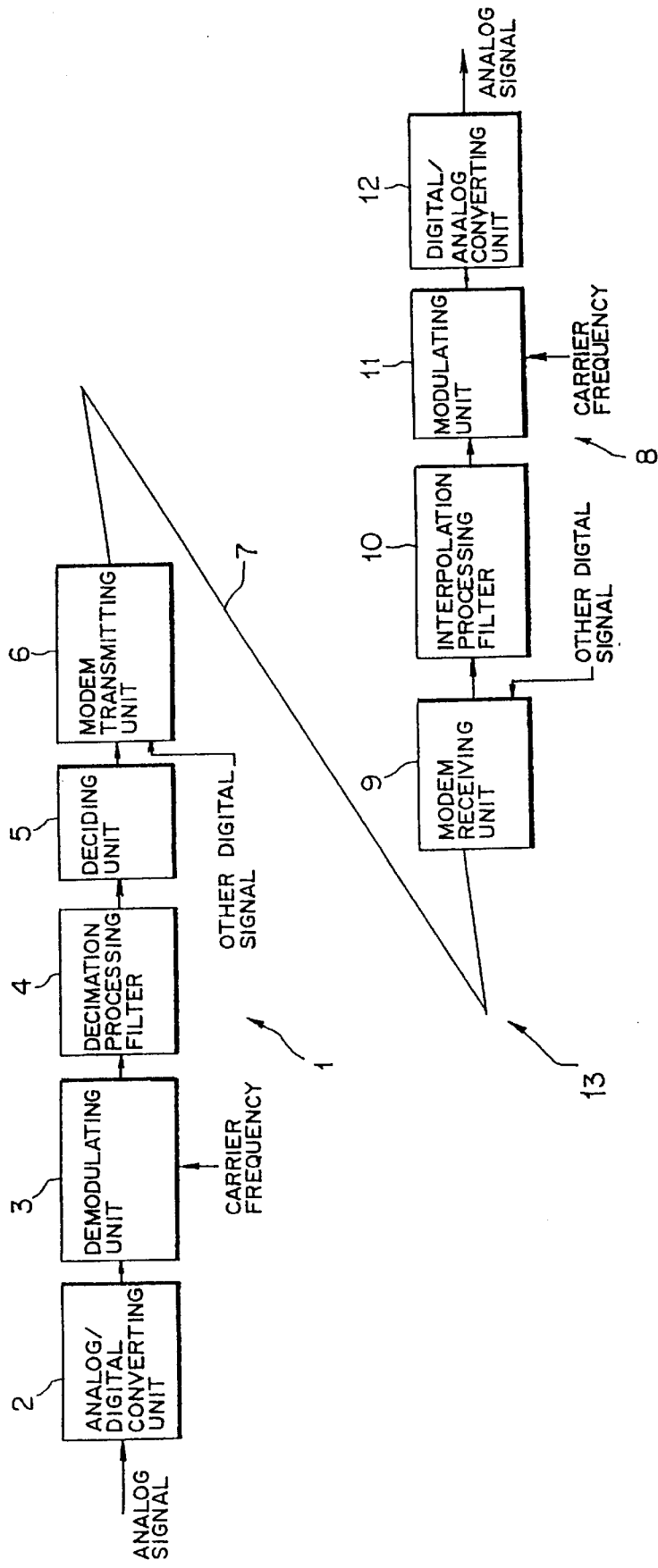
FIG. 1 is a principle block diagram of the present invention.

FIG. 1 is a principle block diagram of the present invention. Referring to FIG. 1 in detail, numeral 13 represents a modem signal transmitting/receiving system. In the modem signal transmitting/receiving system 13, a modem signal transmitter 1 is connected to a modem signal receiver 8 via a transmission line 7.

The modem signal transmitter 1 includes a modem transmitting unit 6, an analog/digital converting unit 2, a demodulating unit 3, a decimation processing filter 4 and a deciding unit 5.

The analog/digital converting unit 2 converts an analog signal into a digital signal. The demodulating unit 3 demodulates the digital signal converted by the analog/digital converting unit 2 with a predetermined carrier frequency signal. The decimation processing filter 4 decimates the demodulated signal from the demodulating unit 3. The deciding unit 5 subjects the output from the decimation processing filter 4 to a coordinate decision on a two-dimensional plane and then inputs the decision result to the modem transmitting unit 6.

The modem transmitting unit 6 subjects the signal obtained by time-divisionally multiplexing the decision result from the deciding unit 5 and another digital signal to a modem process and then transmits the result as a modem signal.

Further, the decimation processing filter 4 can be formed of a roll-off filter that converts from a sampling rate into a symbol rate.

The deciding unit 5 has a decision surface for deciding a coordinate on a two-dimensional plane, the decision surface including decision points which are arranged in such a manner that adjacent decision points are arranged at an equal distance from each other and equilateral hexagonal decision areas each including each of the decision points.

Further, the modem transmitting unit 6 can be formed to time-divisionally multiplex other digital signals other than the digital signals from the deciding unit 5, and to transmit the result.

Numeral 8 represents a modem signal receiver. The modem signal receiver 8 includes a modem receiving unit 9, an interpolation processing filter 10, a modulating unit 11 and a digital/analog converting unit 12.

Here, the modem signal receiver 8 subjects the other digital signal transmitted from the modem transmitting unit 6 in the modem signal transmitter 1 via the transmission line 7 as well as a signal including information having a coordinate decision to an inverse modem process, and then separates both the signals.

The interpolation processing filter 10 subjects the digital signal from the modem receiving unit 9 to an interpolation processing corresponding to a decimation process. The modulating unit 11 modulates the output from the interpolation processing filter 10 with a carrier frequency signal. The digital/analog converting unit 12 converts the digital signal modulated by the modulating unit 11 into an analog signal.

Further, the interpolation processing filter 10 above-mentioned can be formed of a roll-off filter that converts a symbol rate into a sampling rate.

In the modem signal transmitter 1, the analog/digital converting unit 2 converts an analog signal into a digital signal (an analog/digital converting step). The demodulating unit 3 demodulates the digital signal converted in the analog/digital converting step with a predetermined carrier frequency signal (a demodulating step). The decimation processing filter 4 subjects the demodulated signal obtained in the demodulating step to a decimation process (decimation processing step).

Further, the deciding unit 5 subjects a decimation process signal obtained in the decimation processing step to a coordinate decision on a two-dimensional plane and then outputs the decision result to the modem transmitting unit 6 (a deciding step). The modem transmitting unit 6 subjects the decision information obtained in the deciding step to a modem transmitting process and then transmits the result as a modem signal.

In the deciding step of the deciding unit 5, by using, as decision surface for deciding a coordinate on a two-dimensional plane, a decision surface including decision points which are arranged in such a manner that adjacent decision points are arranged at equal distance from each other and equilateral hexagonal decision areas each including each of said decision points, a coordinate on a two-dimensional plane of an input signal point can be decided.

In this case, in the deciding step of the deciding unit 5, the input signal point is converted so as to lie in the first quadrant (a quadrant converting step). After the input signal point is converted in the quadrant converting step to lie in the first quadrant, the input signal is subjected to a normalizing process (a normalizing step). It is decided whether or not which decision area the input signal point belongs to by calculating the distance between the input signal point and an adjacent decision point after the process in the normalizing step (a zone deciding step). Then the input signal point is returned to the original quadrant after the decision in the zone deciding step.

The transmitting step by the modem transmitting unit 6 may include a process of time-divisionally multiplexing digital signals other than the decision result.

Further, in the modem signal receiver 8, the modem receiving unit 9 receives a signal including information that is subjected to a coordinate decision on a two-dimensional plane which is demodulated with a predetermined carrier frequency signal and then is subjected to a decimation process (a receiving step).

The interpolation processing filter 10 subjects the signal having information which is subjected to a coordinate decision received in the receiving step to an interpolation process corresponding to the decimation process (interpolation processing step).

Further, the modulating unit 11 modulates the interpolation processing signal obtained in the interpolation processing step with a carrier frequency signal (modulating step). The digital/analog converting unit 12 converts the digital signal modulated in the modulating step into an analog signal.

Further, in the modem signal transmitter 1, after the demodulating unit 3 demodulates the analog signal, the coordinate on the two-dimensional plane is decided. The modem transmitting unit 6 receives the decision result as digital data and then can time-divisionally multiplex it with other digital signal, thus transmitting the outcome.

The modem signal receiver 8 receives a signal obtained by time-divisionally multiplexing a signal including information with other digital signal, the information that is subjected to a coordinate decision on a two-dimensional plane which is demodulated with a predetermined carrier frequency signal and then subjected to a decimation process, and then separates the other digital signal from the signal having the information with the coordinate decision. Thereafter, the signal which includes information having the coordinate decision is subjected to an interpolation process corresponding to the decimation process and can be further modulated with the carrier frequency signal.

Further, in the modem signal transmitting/receiving system 13, the modem signal transmitter 1 demodulates analog signals and then decides a coordinate on a two-dimensional plane, thus inputting the decision result as digital data to the modem transmitting unit 6. The modem transmitting unit 6 multiplexes time-divisionally the digital data with other digital signal and then transmits the result. The modem receiving unit 9 separates the other digital signal from the signal including information with the coordinate decision. Then the modem signal receiver 8 can subject the signal including information with the coordinate decision from the modem receiving unit 9 to an interpolation process corresponding to the decimation process, thus modulating it with the carrier frequency signal.

Figure 2:
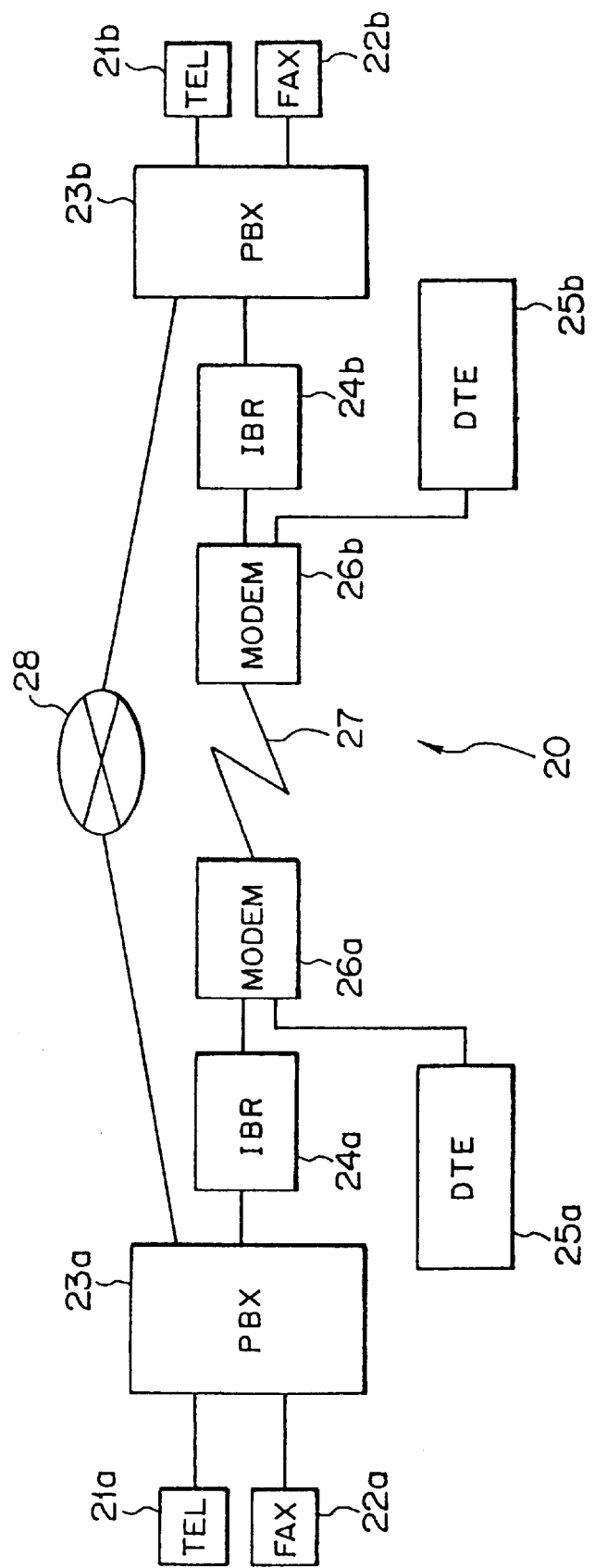
FIG. 2 is a block diagram showing a communications system employing a modem transmitting/receiving system according to an embodiment of the present invention.

FIG. 2 is a block diagram illustrating a communication system employing a modem transmitting/receiving system according to an embodiment of the present invention. In the communication system shown in FIG. 2, numerals 21a and 21b represent telephone terminals (TEL); 22a and 22b represent FAX terminals (FAX); 23a and 23b represent PBXs (private branch exchanges); 24a and 24b represent IBRs (in-band ringers); 25a and 25b represent data terminals (DTE); 26a and 26b represent modems; 27 represents a 4-wire dedicated line (transmission line); and 28 represents a public network.

The PBX 23a is connected to the PBX 23b via the public network 28 or via the IBRs (in-band ringers) 24a and 24b, the modems 26a and 26b, and the 4-wire dedicated line 27.

Each of the IBRs 24a and 24b performs a dial signal converting operation when communications are established between the telephone terminals 21a and 21b or the FAX terminals 22a and 22b via the 4-wire dedicated line 27. Each of the data terminals 25a and 25b, formed of, for example, a personal computer, transmits and receives digital data such as data signal or image information.

Further, the modem 26a is connected to the confront modem 26b via the 4-wire dedicated line 27 to multiplex analog signals from the telephone terminal 21a or FAX terminal 22a on the side of the modem 26a with digital data from the data terminal 25a, thus transmitting the result.

Similarly, the modem 26b is connected to the confront modem 26a via the 4-wire dedicated line 27. The modem 26b separates the analog signals and the digital data from each other when the multiplexed transmission signal is received and then outputs the respective reception data to the terminal 21b, the FAX terminal 22b and the DTE 25b.

Figure 3:
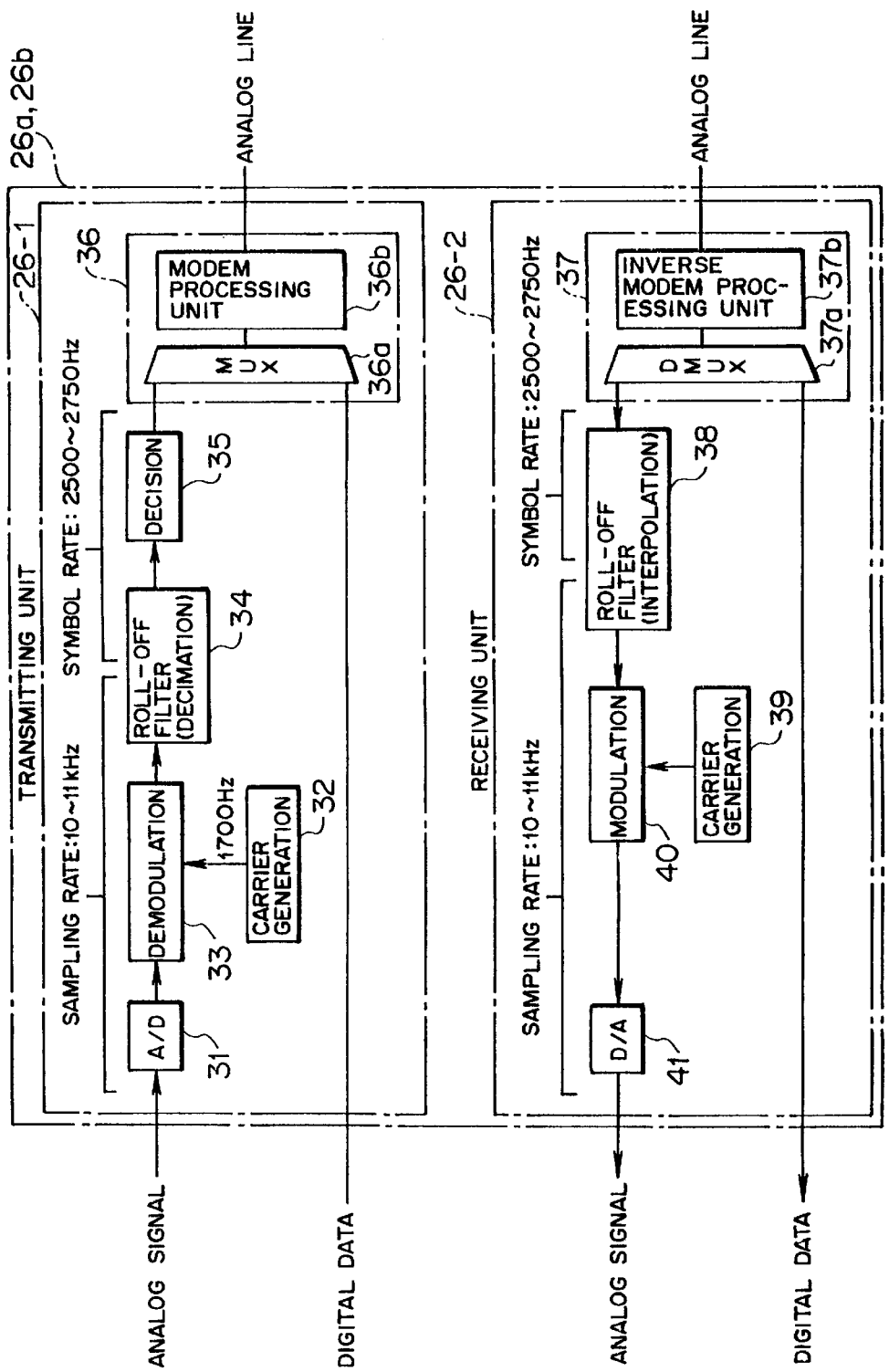
FIG. 3 is a block diagram showing the configuration of a modem according to an embodiment of the present invention.

As shown in FIG. 3, for example, each of the modems 26a and 26b includes a transmitting unit 26-1 and a receiving unit 26-2. Analog signals or digital signals can be transmitted and received bidirectionally between the telephone terminal 21a, the FAX terminal 22a, and the data terminal 25a each housed in the modem 26a and the telephone terminal 21b, the FAX terminal 22b, and the data terminal 25b each housed in the modem 26b.

The configuration of the modem 26a will be described below. The confront modem 26b has basically the same configuration.

That is, as shown in FIG. 3, the transmitting unit 26-1 includes an A/D converting unit 31, a carrier generating unit 32, a demodulating unit 33, a roll-off filter 34, a signal point deciding unit 35 and a modem transmitting unit 36.

The A/D converting unit 31 acting as an analog/digital converting unit receives an analog signal (e.g. of an audio band of 0.3 to 3.4 kHz) input from the telephone terminal 21a or the FAX terminal 22a via the PBX 23a and IBR 24a and then converts it into a digital signal, for example, at a sampling rate of 10 to 11 kHz.

The demodulating unit 33 demodulates an analog signal into a baseband signal by providing angular information having a carrier frequency of, for example, about 1700 Hz generated from the carrier generating unit 32 for the digital data from the A/D converting unit 31 every predetermined angle. That is, the demodulating unit 33 demodulates the digital signal converted by the A/D converting unit 31 with a predetermined carrier frequency signal.

Further, the roll-off filter 34 converts a sampling rate (as high as 10 to 11 kHz) into a symbol rate (e.g. as high as 2500 to 2750 Hz) by subjecting the demodulated signal from the demodulating unit 33 to a decimation process and then reduces the amount of information. The roll-off filter 34 has the function of a decimation processing filter.

Figure 4:
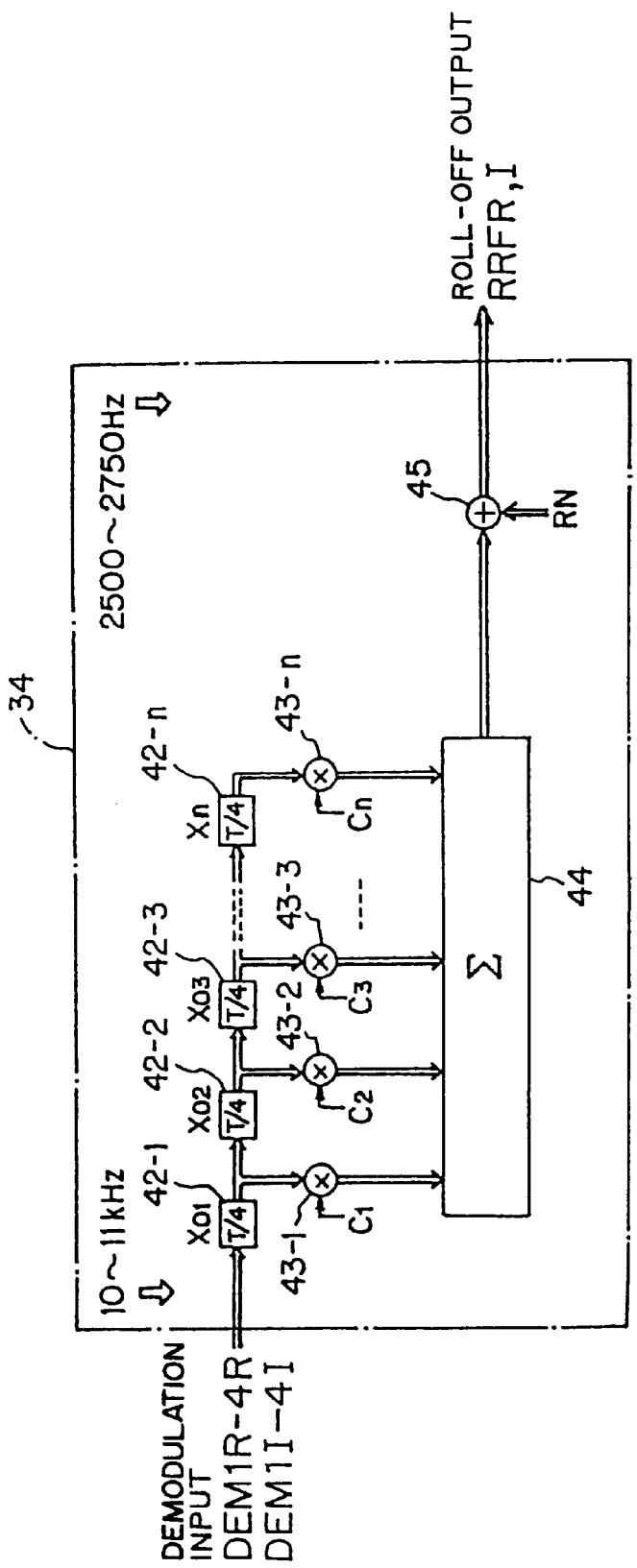
FIG. 4 is a block diagram showing the main portion of the transmitting unit in a modem according to an embodiment of the present invention.

The roll-off filter 34 has the detail configuration of the equivalent circuit shown in FIG. 4. That is, the roll-off filter 34 shown in FIG. 4 consists of delay taps 42-1 to 42-n, multipliers 43-1 to 43-n, a summing arithmetic unit 44 and a rounding unit 45.

The delay taps 42-1 to 42-n are serially connected to delay the input signal by ¼ periods (in this case, $1/11000$ to $1/10000$ seconds). In other words, the delay taps 42-1 to 42-n output the signals obtained by sequentially delaying the transmission data from the demodulating unit 33 by ¼ periods.

Further, the multipliers 43-1 to 43-n multiply the output signals from the delay taps 42-1 to 42-n by tap coefficients $C_1$ to $C_n$, respectively. The result is output to the summing arithmetic unit 44.

The summing arithmetic unit 44 processes the sum of four output signals from multipliers 43-1 to 43-n and then outputs the corresponding sum arithmetic value every time four input signals are newly input (decimation process). The rounding unit 45 rounds the total arithmetic value from the summing arithmetic unit 44.

Thus the roll-off filter 34 receives the output signal (real component, imaginary component; DEM1R-4R, DEM1I-4I) from the demodulating unit 33 and outputs data of one symbol per four samples as data of one symbol per sample and as a roll-off output (real component, imaginary component; RRFR, I).

The 1700 Hz frequency band generated from the carrier generating unit 32 and the frequency band of the symbol rate of 2500 to 2750 Hz converted by the roll-off filter 34 can be used in common by considering audio and the frequency band set according to the Recommendation V.29, V.22 bis or V32. Particularly, the demodulation frequency band of 1700 Hz corresponds to the carrier frequency of G3FAX according to the Recommendation V.29.

The signal point deciding unit 35 receives the signal which is subjected to a decimation process by means of the roll-off filter 34 and performs a coordinate decision by providing the necessary and sufficient number of bits (within 8 bits in total) to the X- and Y-coordinates on the two-dimensional plane, thus converting the signal demodulated to a base band signal to the amount of information necessary for transmission up to 9600 bps. In other words, the signal point deciding unit 35 functions as a deciding unit that subjects the output from the roll-off filter 34 to a coordinate on the two-dimensional plane and then outputs the decision result.

Figure 7:
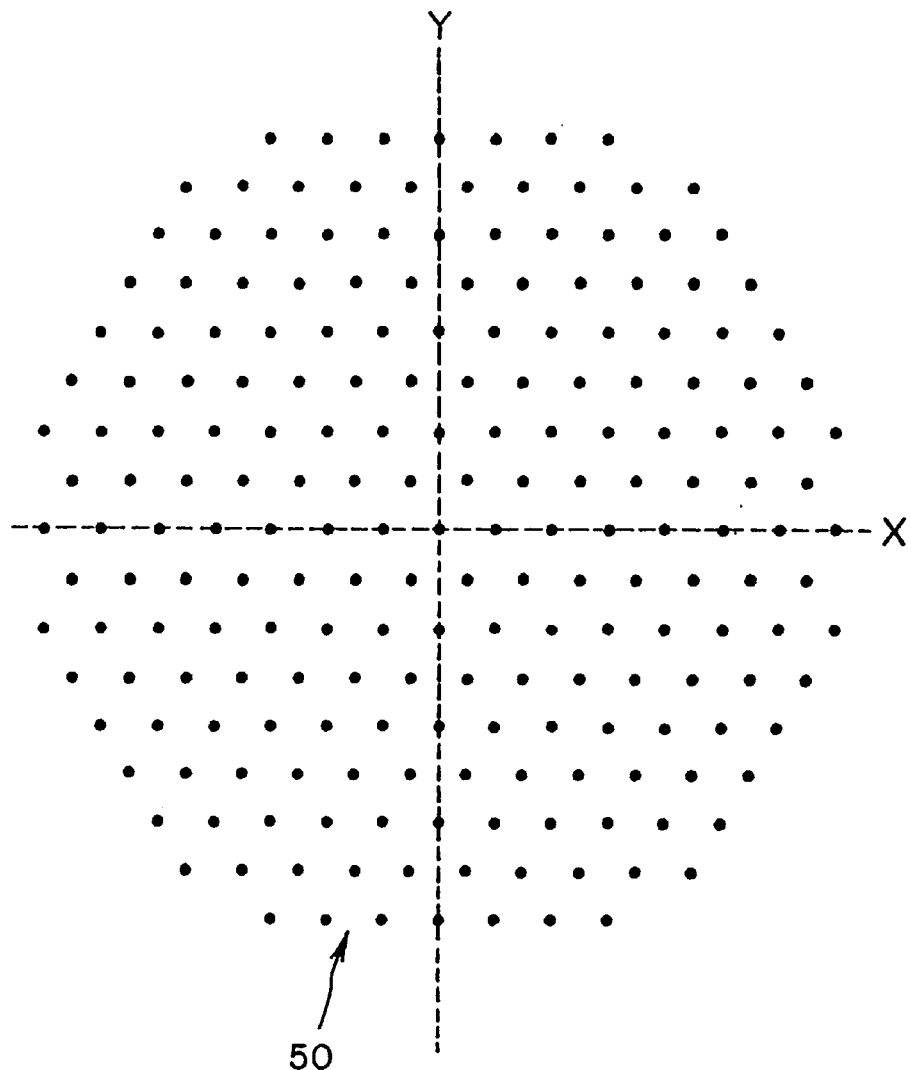
FIG. 7 is a diagram showing a decision surface included in the signal point deciding unit according to an embodiment of the present invention.
Figure 8:
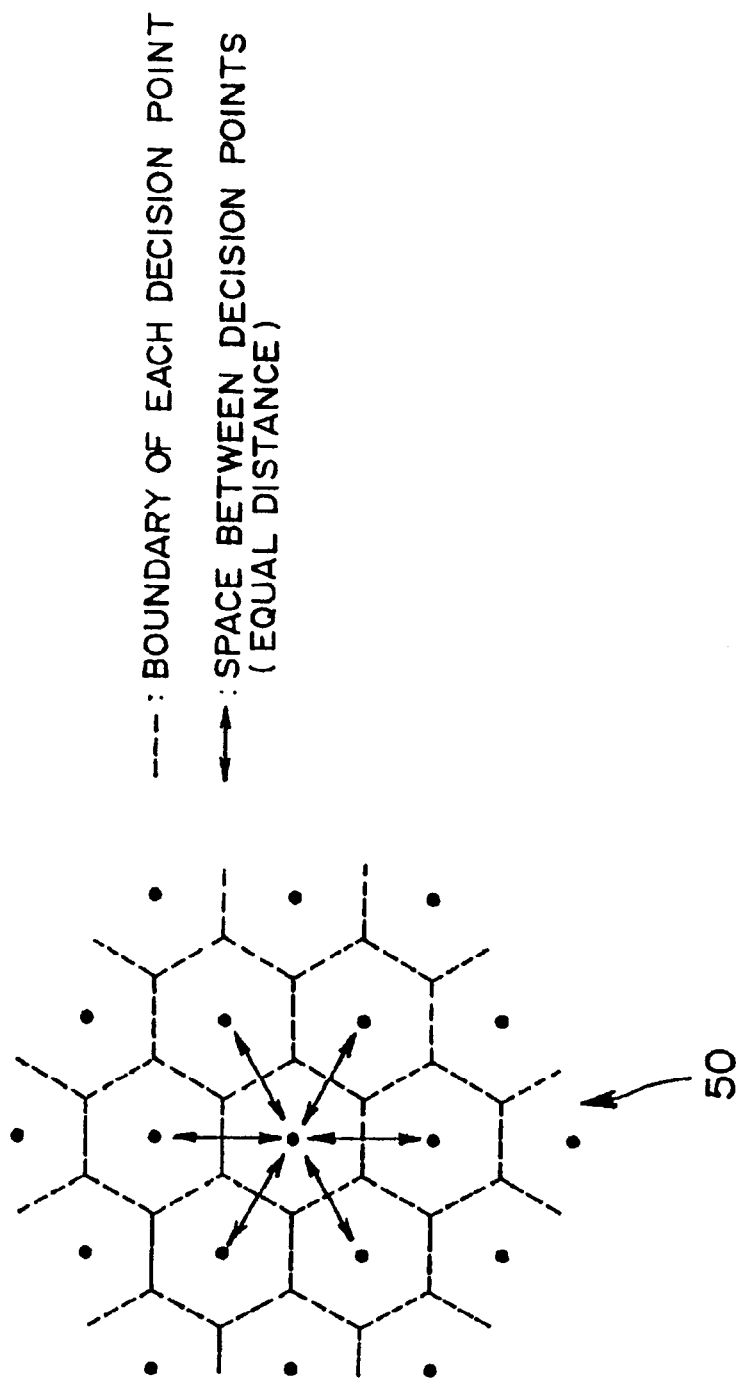
FIG. 8 is a diagram showing a decision surface included in the signal point deciding unit according to an embodiment of the present invention.

In the signal point deciding unit 35, the surface, for example, shown in FIG. 7 can be used as a decision surface 50 which decides a coordinate on the two dimensional plane. That is, the decision surface 50 shown in FIG. 7 has equilateral hexagonal decision areas (areas surrounded with dotted lines shown in FIG. 8) each of which includes a decision point, with adjacent decision points spaced equally.

Figure 9:
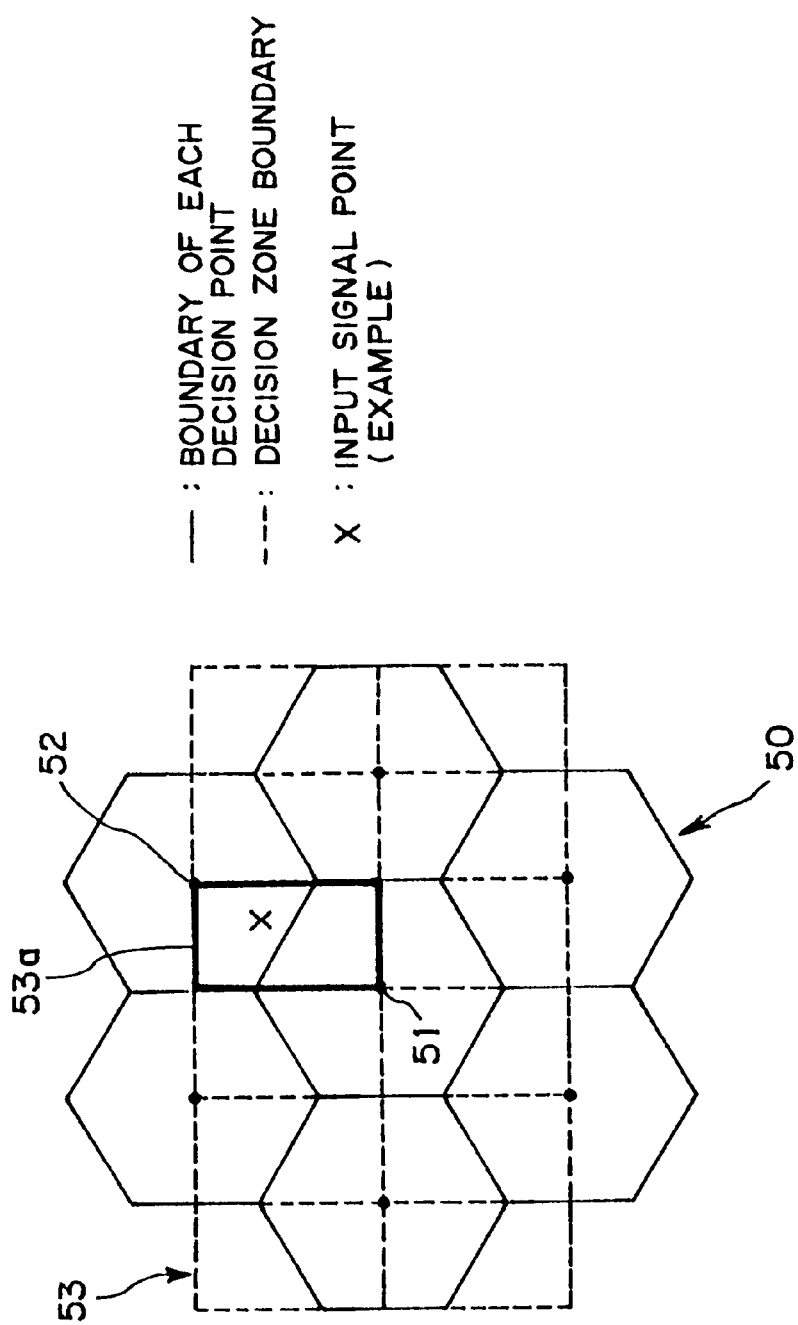
FIG. 9 is a diagram used for explaining a signal point decision aspect of the signal point deciding unit according to an embodiment of the present invention.

In the signal point deciding unit 35, the decision surface 50 shown in FIG. 7 is divided into rectangular zones 53 including adjacent decision points as boundary points, for example, shown in FIG. 9. After it is decided as to which rectangular zone 53 the signal point 'x' belongs, the signal point decision is performed by processing the distance between the signal point 'x' and two decision points included in the rectangular zone 53 at which the signal point is positioned.

The signal point deciding unit 35 includes a table that holds information on the rectangular zone for the coordinate value of an input signal point. The rectangular zone 53 at the input signal point described above is decided by referring to the table.

Further, the modem transmitting unit 36 subjects information obtained by time-divisionally multiplexing the decision result from the signal point deciding unit 35 with other digital signal to a modem process (modem transmitting process) and then transmits the result as a modem signal. The modem transmitting unit 36 includes a multiplexing unit 36a and a modem processing unit 36b.

The multiplexing unit 36a time-divisionally multiplexes digital data (e.g. a transmission rate of 19.2 kbps or more) decided by the signal point deciding unit 35 with digital data from the data terminal 25a and then outputs the result to the modem processing unit 36b at a transmission rate of, for example, 28.8 kbps.

Specifically, the multiplexing unit 36a divides input digital data by a frame unit and then allocates and outputs the data slot in each frame for the digital data from the signal point deciding unit 35 and for the digital data form the data terminal 25a.

Further, the modem processing unit 36b subjects the digital data time-divisionally multiplexed by the multiplexing unit 36a to a modem process including a Gray/natural conversion, sum component, signal point generation, roll-off filtering process, modulating process, D/A converting process, and then outputs the result as a modem signal.

The carrier generating unit 32, the demodulating unit 33, the roll-off filter 34, the deciding unit 35, the modem transmitting unit 36 are constructed in hardware using a DSP (Digital Signal Processor) and an MPU (Microprocessor Unit).

In the modem 26a, the signal process of the receiving unit 26-2 performs basically the inverse of that in the transmitting unit 26-1. The receiving unit 26-2 consists of a modem receiving unit 37, a roll-off filer 38, a carrier generating unit 39, a modulating unit 40 and a D/A converting unit 41.

The modem receiving unit 37 subjects the digital signal received from the modem transmitting unit 36 in the confront modem 26b via the 4-wire dedicated line (analog line) 27 to an inverse modem process, and then separates the digital data sent from the data terminal 25b from the signal including information having a coordinate decision. The modem receiving unit 37 includes a separating unit 37a and an inverse modem processing unit 37b.

That is, the inverse modem processing unit 37b performs the inverse modem process including an A/D converting process, demodulating process, a roll-off filtering process, an automatic gain control, an automatic equalization, a carrier phase correction, a signal point decision, a differential component, and the like.

The separating unit 37a separates the reception signal subjected to an inverse modem process by the inverse modem processing unit 37b into digital data from the data terminal 25b and the signal including information subjected to a coordinate decision in the transmitting unit 26-1 in the modem 26b. Of separated signals, the digital data from the data terminal 25b is output as the output of the receiving unit 26-2 to the data terminal 25a. The signal having information including a coordinate decision is output to the roll-off filter 38.

Further, the roll-off filter 38 functions as an interpolation processing filter that subjects a signal including information having a coordinate decision from the modem receiving unit 37 to an interpolation process corresponding to the decimation process of the roll-off filter 34 in the transmitting unit 26-1.

That is, the amount of information is returned to the original value by converting the symbol rate (e.g. 2500 to 2750 Hz) to the sampling rate (10 to 11 kHz) through the filtering process of the roll-off filter 38.

Figure 5:
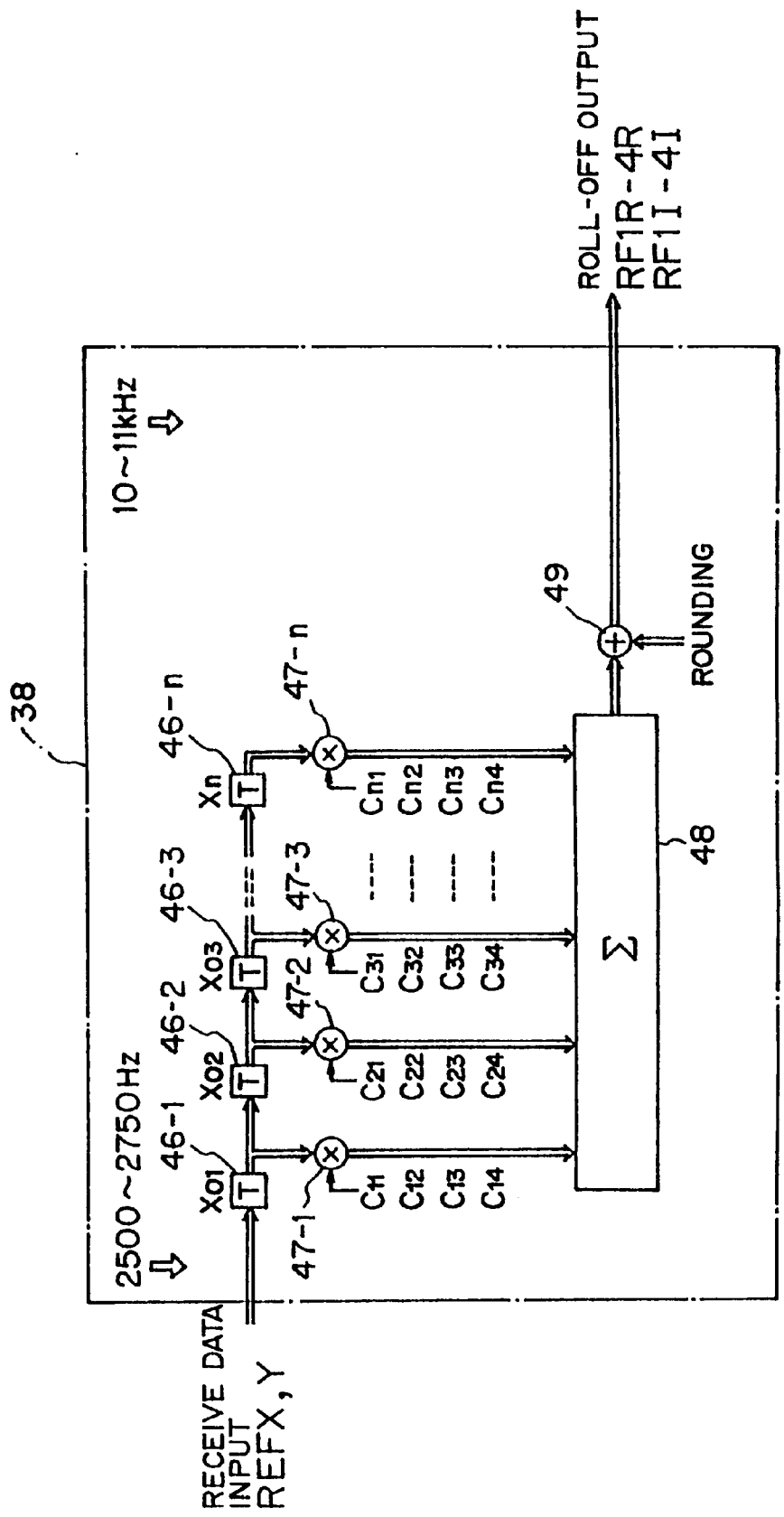
FIG. 5 is a block diagram showing the main portion of the receiving unit in a modem according to an embodiment of the present invention.

The roll-off filter 38 has the detail configuration like the equivalent circuit shown in FIG. 5. That is, the roll-off filter 38 shown in FIG. 5 includes delay taps 46-1 to 46-n, multipliers 47-1 to 47-n, a summing arithmetic unit 48 and a rounding unit 49.

The delay taps 46-1 to 46-n are serially connected to delay the input signal by one period (in this case, $1/2750$ to $1/2500$ seconds). The multipliers 47-1 to 47-n multiply respectively the outputs of the delay taps 46-1 to 46-n by four tap coefficients $C_{11}$ to $C_{14}, \ldots, C_{n1}$ to $C_{n4}$ and then outputs four values as the results.

Four tap coefficients multiplied by the multipliers 47-1 to 47-n are multiplied, for example, every $1/4$ periods and then the results are output. If the three tap coefficient values at the rear stage are "0", the result is "0".

The summing arithmetic unit 48 operates the sum of the outputs from the multipliers 47-1 to 47-n. Every time one piece of reception data is input to the delay tap 46-1, the total arithmetic value corresponding to four output signals output from the multipliers 47-1 to 47-n is output as four outputs. Further, the rounding unit 49 rounds the total arithmetic value from the summing arithmetic unit 48.

In such an operation, the roll-off filter 38 receives the output signal (real component, imaginary component; REFX, Y) from the modem receiving unit 37 and then converts a symbol rate (2500 Hz to 2750 Hz) into a sampling rate (10 kHz to 11 kHz), thus outputting the result as a roll-off output (real component, imaginary component; RF1R-4R, RFlI-4I).

In the receiving unit 26-2, the modulating unit 40 modulates the output signal from the roll-off filter 38 with a carrier frequency signal of about 1700 Hz generated by the carrier generating unit 39, and then outputs a base band signal as a signal in the original frequency band (e.g. an audio signal of 0.3 to 3.4 kHz).

Further, the D/A converting unit 41 acting as a digital/analog converting unit converts a digital signal modulated by the modulating unit 40 into an analog signal. The converted analog signal is output as the output of the receiving unit 26-2 to the IBR 24.

The operation of a communication system employing the modem transmitting/receiving system with the above-mentioned configuration according to the present embodiment will be explained below.

That is, when a signal is transmitted from the telephone terminal 21a or FAX terminal 22a to the telephone terminal 21b or FAX terminal 22b via the 4-wire dedicated line 27, the signal (analog signal) transmitted from the transmitting side terminals 21a or 22a is input to the transmitting unit 26-1 of the modem 26a via the PBX 23a and IBR 24a.

In the transmitting unit 26-1 of the modem 26a, the A/D converting unit 31 converts the analog signal from the IBR 24a into a digital signal (an analog to digital converting step). The demodulating unit 33 demodulates the converted digital signal with a predetermined carrier frequency signal (a demodulating step).

Further, the roll-off filter 34 subjects the demodulated signal demodulated by the demodulating unit 33 to a decimation process (a decimation processing step). The signal point deciding unit 35 subjects the decimation process signal from the roll-off filter 34 to a coordinate decision on a two-dimensional plan surface, and then inputs the decision result to the modem transmitting unit 36 (a deciding step).

In the signal point deciding unit 35, the decision surface 50 which has equilateral hexagonal decision areas each of which including a decision point, with adjacent decision points spaced equally, as shown in FIG. 7, is used as a decision surface to decide the coordinate on a two-dimensional plane for an input signal point.

Figure 6:
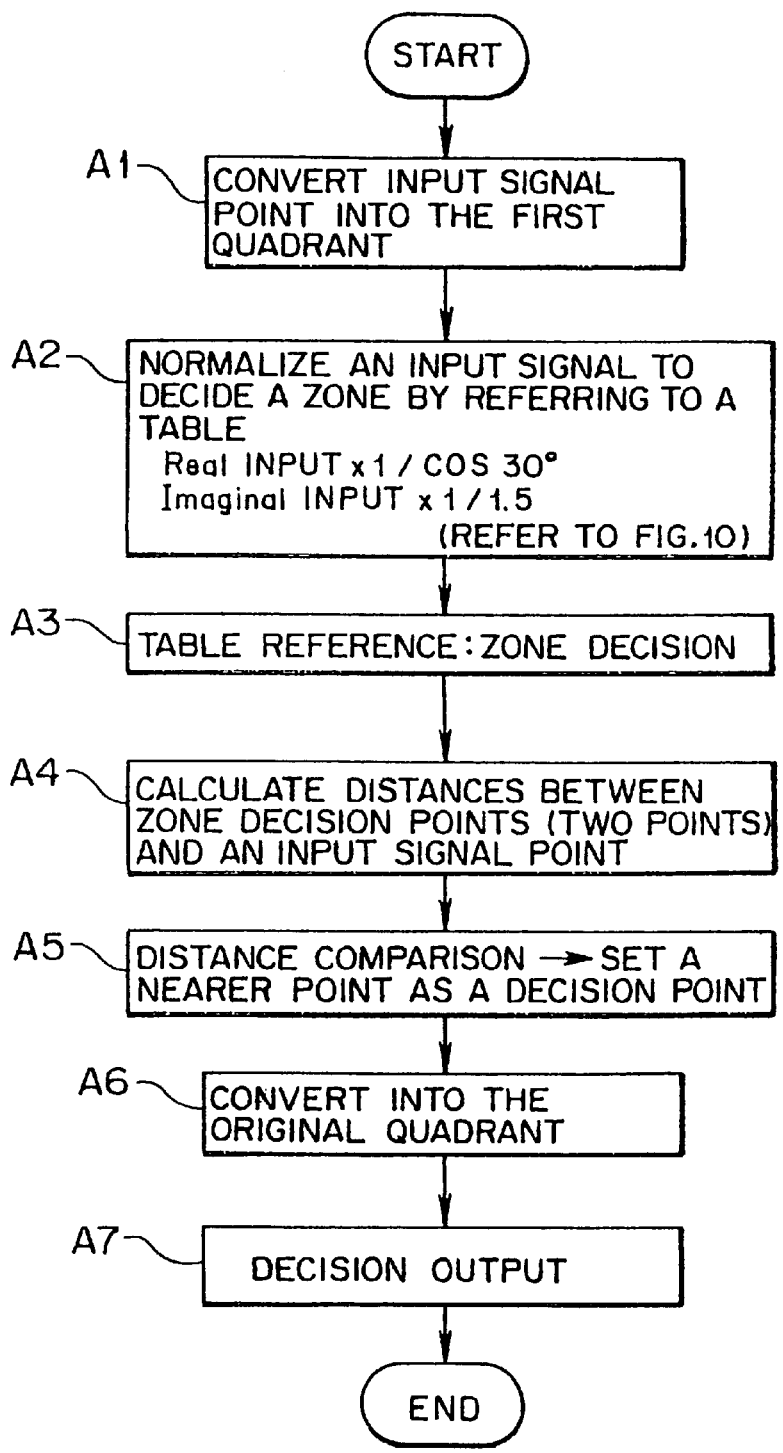
FIG. 6 is a flowchart used for explaining a signal point decision aspect of a signal point deciding unit according to an embodiment of the present invention.

The aspect of deciding a signal point on the signal point deciding unit 35 will be described below by using FIGS. 9 and 10, together with the flowchart shown in FIG. 6.

First, the signal point deciding unit 35 subjects the signal point input from the roll-off filter 34 to a coordinate conversion to place all the signal points in the first quadrant (quadrant converting step, step A1).

Sequentially, if one supposed that a rectangular zone 53 which includes adjacent decision points as boundary points, it is assumed, for example, that the rectangular zone 53a (the zone surrounded with thick lines shown in FIG. 9) includes as boundary vertexes the decision points 51 and 52 shown in FIG. 9.

In order to decide as to which rectangular zone 53 an input signal belongs, the signal point deciding unit 35 multiplies the coordinate value (X, Y) of the input signal by a coefficient and then normalizes the input signal through a scale converting operation (normalizing step).

Figure 10:
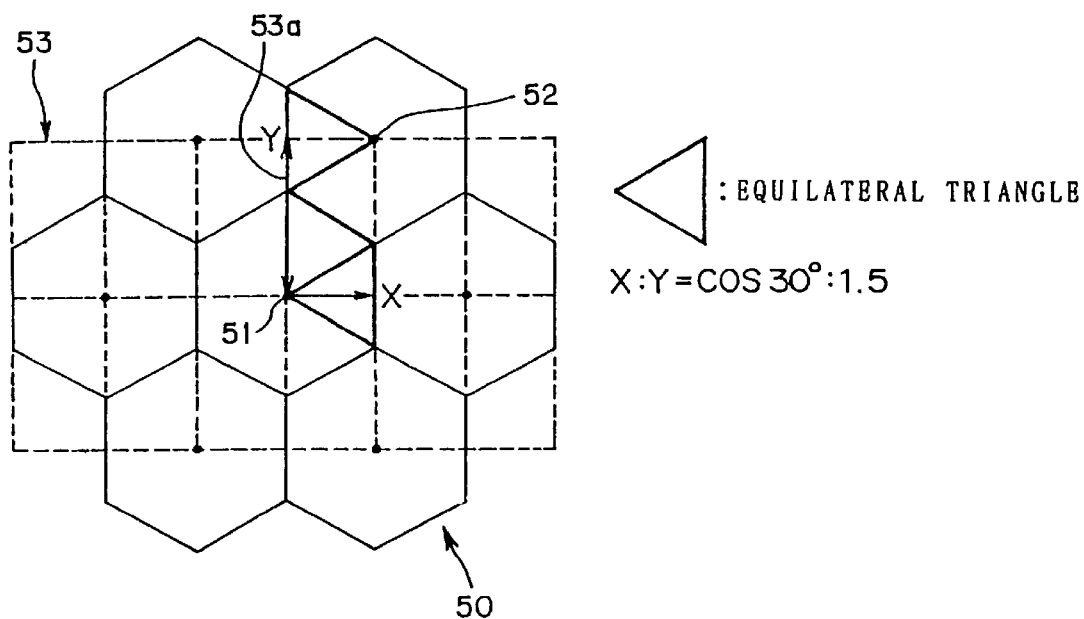
FIG. 10 is a diagram used for explaining a signal point decision aspect of the signal point deciding unit according to an embodiment of the present invention.
Figure 11:
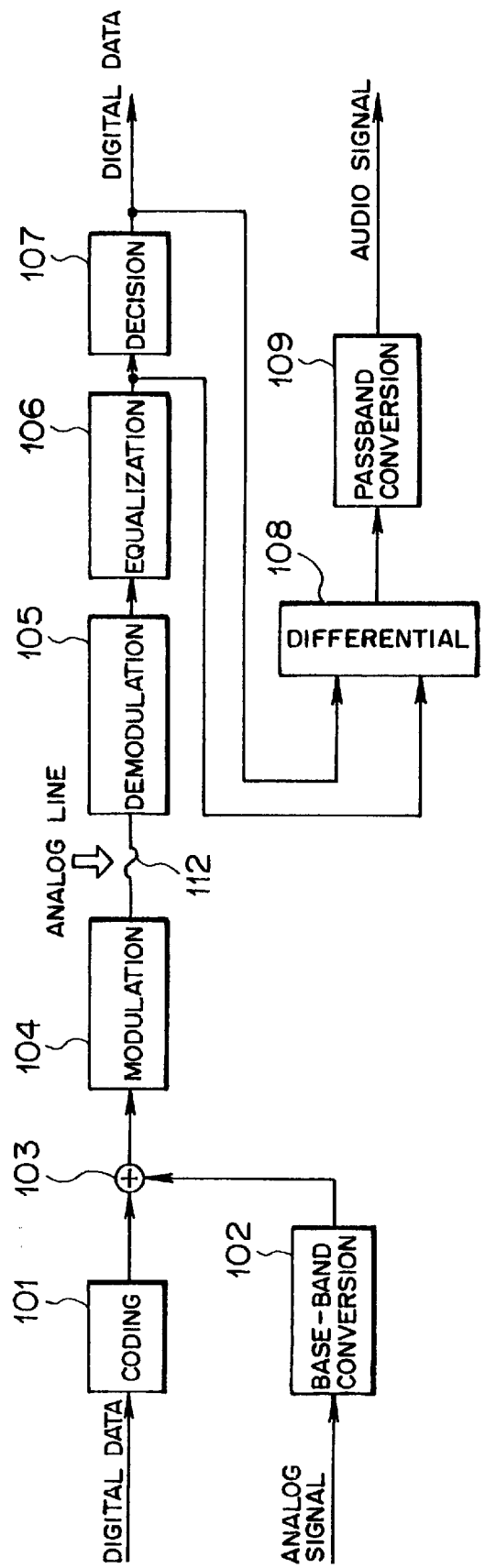
FIG. 11 is a block diagram showing a prior art signal transmitting system.
Figure 12:
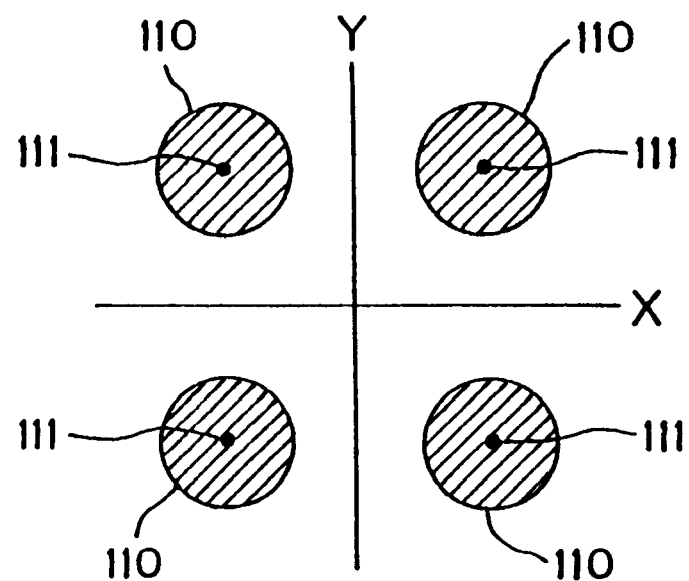
FIG. 12 is a diagram showing the operation of a prior art signal transmitting system.

In this case, as shown in FIG. 10, since the ratio of the sides forming the rectangular zone 53 is expressed by the following formula (1), 1/cos 30° acting as a coefficient is multiplied by the X-coordinate value (real input) of the signal point while 1/1.5 acting as a coefficient is multiplied by the Y-coordinate value (imaginary input) (step A2).

$$X:Y = \cos 30° : 1.5 \quad (1)$$

Further, the rectangular zone 53 including the coordinate of the input signal point is decided by referring to the table in the signal point deciding unit 35, based on the coordinate data after normalizing the input signal (step A3). In this step, the decision points which are closest to the input signal point can be specified for two decision points.

In this case, since the signal point 'x' shown in FIG. 9 is within the rectangular zone 53a, by referring to the table in the signal point deciding unit 35, two decision points 51 and 52 can be specified as the decision points closest to the input signal point 'x'.

The table in the signal point deciding unit 35 holds information regarding the rectangular zone 53 including the position of the coordinate value to the coordinate value of an input signal. That is, since the input signal point is normalized, the rectangular zone 53 can be easily decided by referring to the table.

When the rectangular zone 53 including the position of the input signal point is decided, the distance between two decision points included in the decided rectangular zone 53 (zone deciding points) and the signal point is processed (step A4). Of the distances between the signal point and two decision points obtained as the arithmetic result, the decision point closer to the signal point is selected as the decision result (zone deciding step, step A5).

When the input signal point is decided in such a way, the input signal point decided is returned to the original quadrant (quadrant converting step, step A6) and then is output as the decision result from the signal point deciding unit 35 to the modem transmitting unit 36. The modem transmitting unit 36 subjects the decision information from the signal point deciding unit 35 to a modem transmitting process and then transmits the result as a modem signal (transmitting step, step A7).

Since the signal point deciding unit 35 decides the signal point using the decision surface 50 as mentioned above, decision can be made with the number of decision points (the number of bits) smaller than that in the other gridlike or concentric circular decision surface. In FIG. 7, the number of decision points is 253 and the number of bits is about 7.98 bits.

In this case, the modem transmitting unit 36 multiplexes time-divisionally the digital data subjected to a signal point decision by the signal point deciding unit 35 with other digital signal from the data terminal 25a and then outputs the result as a modem signal. Thus, the 4-wire dedicated line acting as a single analog line can be effectively used.

In other words, the above-mentioned transmitting step includes the step of time-divisionally multiplexing other digital signal in addition to the decision result from the signal point deciding unit 35.

In the above explanation, when the signal point deciding unit 35 in the modem 26a acting as the transmitting side modem decides a signal point, the scale of the decision surface 50 at the signal point shown in FIG. 7 is the same as that of the signal point input from the roll-off filter 34. When the two scales are different, the input signal point is transformed into the same scale as a decision point, following the zone decision in the step A3, and then the distance between the zone deciding point and the input signal point is worked out.

As described above, when the modem processing unit 36a in the modem 26a transmits a modem signal, the modem 26b acting as a modem signal receiving device receives the reception modem signal via the 4-wire dedicated line 27. The modem 26b processes the reception signal basically inversely to the modem 26a acting as a modem signal transmitting device.

That is, the inverse modem processing unit 37b in the modem receiving unit 37 subjects the digital signal being the reception modem signal input via the 4-wire dedicated line 27 to the inverse modem process (modem receiving process). Further, of digital signals received from the modem 26a, the separating unit 37a separates the digital signal from the data terminal 25a from the signal having information on a coordinate decision (receiving step).

Of digital signals separated by the separating unit 37a, the digital signal from the data terminal 25a is output to the data terminal 25b as outputs of the receiving unit 26-2. The roll-off filter 38 subjects the signal having information on a coordinate decision to an interpolation process corresponding to the decimation process of the roll-off filter 34 so that a symbol rate is converted to a sampling rate (interpolation processing step).

When the roll-off filter 38 subjects the signal including information having a coordinate decision to an interpolation process, the modulating unit 40 modulates the result with the carrier frequency signal from the carrier generating unit 39 (modulating step).

Thereafter, the D/A converting unit 41 converts the digital signal modulated by the modulating unit 40 into an analog signal and then outputs the converted signal as the output of the receiving unit 26-2 to the IBR 24b (digital/analog converting step).

As described above, in the communication system employing the modem transmitting/receiving system according to an embodiment of the present invention, the transmitting side modem 26a acting as a modem signal transmitting device includes the A/D converting unit 31, the demodulating unit 33, the roll-off filter 34, and the signal point deciding unit 35. Hence there is the advantage in that high-rate data such as carrier signals with a transmission rate of 9600 bps which are used for FAX signals set according to the Recommendation V.29 can be communicated.

Since the modem transmitting unit 36 transmits other digital data in the multiplex mode, analog lines can be effectively used. Hence there is the advantage in that the line use charge can be reduced.

Further, the signal point deciding unit 35 has a decision surface for deciding a coordinate on a two-dimensional plane, the decision surface including decision points which are arranged in such a manner that adjacent decision points are arranged at equal distance from each other and equilateral hexagonal decision areas each including each of the decision points. The decision can be made with the number of decision points (the number of bits) smaller than that in other gridlike or concentric decision surface by deciding the signal point using this decision surface. As a result, the signal point can be effectively decided.

In the detail explanation of the preferred embodiment described above, a 4-wire dedicated line has been used as a transmission line. However, the present invention should not be limited only to the present embodiment. Other lines can be used.

As described above in detail, according to the present invention, the modem signal transmitter includes an analog/digital converting unit, a demodulating unit, a decimation processing filter, and a deciding unit. A coordinate on a two-dimensional plane is decided after an analog signal is converted into a digital signal and then demodulated. The result is input as digital data to the modem transmitting unit. Hence, there is the advantage in that high-rate data such as carrier signals of a transmission rate of 9600 bps used for FAX signals set according to the Recommendation V. 29 can be communicated.

The present invention also has the advantage of effectively using analog lines since the modem transmitting unit multiplexes other digital data for transmission, whereby the line use charge can be reduced.

Further, according to the present invention the deciding unit has a decision surface for deciding a coordinate on a two-dimensional plane, which the decision surface includes decision points which are arranged in such a manner that adjacent decision points are arranged at equal distance from each other and equilateral hexagonal decision areas each including each of the decision points. The decision can be made with the number of decision points (the number of bits) smaller than that in other gridlike or concentric decision surface by deciding the signal point using this decision surface. As a result, the signal point can be effectively decided.

According to the present invention, the modem signal receiver includes the interpolation processing filter, the modulating unit, and the digital/analog converting unit. Hence, there is the advantage in that high-rate data such as carrier signals of a transmission rate of 9600 bps used for FAX signals set according to the Recommendation V. 29 can be communicated.

Further, according to the present invention, when receiving a signal obtained by time-divisionally multiplexing a signal with information and other digital signal, the information regarding that a signal subjected to a decimation process after modulation with a predetermined carrier frequency signal is subjected to a coordinate decision on a two-dimensional plane, the modem signal receiver can separate the two signals. Hence, there is the advantage in that analog lines can be effectively used and the line use charge can be reduced.

What is claimed is:

1. A modem signal transmitter comprising:
    a modem transmitting unit;
    an analog/digital converting unit for receiving and converting an analog signal into a digital signal;
    a demodulating unit, coupled to said converting unit, for demodulating said digital signal converted by said analog/digital converting unit with a predetermined carrier frequency signal applied to said demodulating unit;
    a decimation processing filter for converting a sampling rate into a symbol rate for a demodulated signal from said demodulating unit; and
    a deciding unit for subjecting the output from said decimation processing filter to a coordinate decision on a two-dimensional plane and then inputting a decision result to said modem transmitting unit.

2. The modem signal transmitter according to claim 1, wherein said decimation processing filter comprises a roll-off filter that converts a sampling rate into a symbol rate.

3. The modem signal transmitter according to claim 1, wherein said deciding unit has a decision surface for deciding a coordinate on a two-dimensional plane, said decision surface including decision points which are arranged in such a manner that adjacent decision points are arranged at an equal distance from each other and equilateral hexagonal decision areas each includes each of said decision points.

4. The modem signal transmitter according to claim 1, wherein said modem transmitting unit multiplexes time-divisionally and transmits digital signals other than digital signals outputted from said deciding unit.

5. The modem signal transmitter according to claim 4, wherein said modem transmitting unit includes a multiplexing unit coupled to said deciding unit and a modem processing unit for subjecting the other digital signals to a modem process to obtain a modem signal outputted from the modem signal transmitter.

6. A modem signal transmitting method comprising:
    an analog/digital converting step for converting an analog signal into a digital signal;
    a demodulating step for demodulating said digital signal converted in said analog/digital converting step with a predetermined carrier frequency signal;
    a decimation processing step for converting a sampling rate into a symbol rate for a demodulated signal obtained in said demodulating step;
    a deciding step for subjecting a decimation processed signal obtained in said decimation processing step to a coordinate decision on a two-dimensional plane and then inputting the decision result to a modem transmitting unit; and
    a transmitting step for subjecting a decision information obtained in said deciding step to a modem transmitting process and then transmitting an obtained result as a modem signal.

7. The modem signal transmitting method according to claim 6, wherein said deciding step includes deciding a coordinate on a two-dimensional plane of an input signal point, using, as a decision surface for deciding the coordinate on the two-dimensional plane, a decision surface including decision points which are arranged in such a manner that adjacent decision points are arranged at equal distance from each other and equilateral hexagonal decision areas each include each of said decision points.

8. The modem signal transmitting method according to claim 7, wherein said deciding step includes:
a quadrant converting step for converting said input signal point to be placed in a first quadrant;
a normalizing step for subjecting said input signal point to a normalizing process after said input signal point has been converted to be placed in the first quadrant in said quadrant converting step;
a zone deciding step for calculating a distance between said input signal point and a decision point adjacent thereto after a process in said normalizing step and then deciding as to which decision area said input signal point belongs; and
a quadrant inverse-converting step for returning said input signal point to the original quadrant after the decision in said zone deciding step.

9. The modem signal transmitting method according to claim 6, wherein said transmitting step includes a process for multiplexing time-divisionally digital signals other than a decision result in said deciding step.

10. A modem signal transmitting method comprising the steps of:
converting an analog signal into a digital signal in a modem signal transmitter:
demodulating the converted signal into a demodulated signal in said modem signal transmitter with a predetermined carrier frequency signal;
converting a sampling rate into a symbol rate for the demodulated signal in said modem signal transmitter;
deciding a coordinate on a two-dimensional plane after said demodulated signal has been converted, and then inputting a decision result as digital data to a modem transmitting unit of the modem signal transmitter; and
multiplexing time-divisionally the digital data with another digital signal in said modem transmitting unit and then transmitting the result.

11. A modem signal receiver comprising:
a modem receiving unit which receives a digital signal having information that is subjected to a coordinate decision on a two-dimensional plane which is demodulated with a predetermined carrier frequency signal and for which then a sampling rate is converted into a symbol rate;
an interpolation processing filter for converting a symbol rate into a sampling rate for the digital signal from said modem receiving unit;
a modulating unit for modulating an output from said interpolation processing filter with said carrier frequency signal applied to said modulating unit; and
a digital/analog converting unit for converting said digital signal modulated by said modulating unit into an analog signal outputted from the modem signal receiver.

12. The modem signal receiver according to claim 11, wherein said interpolation processing filter comprises a roll-off filter that converts a symbol rate to a sampling rate.

13. The modem signal receiver according to claim 11, further comprising a carrier frequency generating unit coupled to said modulating unit for applying thereto said carrier frequency signal.

14. The modem signal receiver according to claim 11, and further comprising a modem receiving unit which includes an inverse modem processing unit for performing an inverse modem process to said signal received by the modem signal receiver and a separating unit for separating said signal and another digital signal from each other, wherein said separated signal is inputted to said interpolation processing filter.

15. A modem signal receiving method comprising:
a receiving step for receiving a signal having information which is subjected to a coordinate decision on a two-dimensional plane, which is demodulated with a predetermined carrier frequency signal and for which a sampling rate is then converted into a symbol rate;
an interpolation processing step for converting a symbol rate into a sampling rate for the signal having information which is subjected to said coordinate decision received in said receiving step,
a modulating step for modulating an interpolation processing signal obtained in said interpolation processing step with said carrier frequency signal; and
a digital/analog converting step for converting a digital signal modulated in said modulating step into an analog signal.

16. A modem signal receiving method comprising the steps of:
receiving a signal obtained by time-divisionally multiplexing a signal having information including a coordinate decision on a two-dimensional plane which is demodulated with a predetermined carrier frequency signal and for which a sampling rate is converted into a symbol rate, with another digital signal;
separating said another digital signal from said signal having information including said coordinate decision;
converting a symbol rate into a sampling rate for said signal having information including said coordinate decision; and
further modulating said signal with said predetermined carrier frequency signal.

17. A modem signal transmitting/receiving system comprising a modem signal transmitter and a modem signal receiver which are connected via a transmission line;
said modem signal transmitter including:
an analog/digital converting unit for converting an analog signal into a digital signal;
a demodulating unit for demodulating the digital signal converted by said analog/digital converting unit with a predetermined carrier frequency signal;
a decimation processing filter for converting a sampling rate into a symbol rate for a demodulated signal received from said demodulating unit;
a deciding unit for subjecting an output from said decimation processing filter to a coordinate decision on a two-dimensional plane and then outputting a decision result; and
a modem transmitting unit for subjecting an output of said deciding unit to a modem process, the output being obtained by time-divisionally multiplexing said decision result from said deciding unit with another digital signal, and then transmitting a processed result as a modem signal; and
said modem signal receiver including:

a modem receiving unit for subjecting said another digital signal transmitted from said modem transmitting unit of said modem signal transmitter via said transmission line and the modem signal having information including said coordinate decision, to an inverse modem process and then separating said signal including said information and said another signal from each other;

an interpolation processing filter for converting a symbol rate into a sampling rate for the modem signal having information including said coordinate decision from said modem receiving unit;

a modulating unit for modulating the output from said interpolation processing filter with said predetermined carrier frequency signal; and a digital/analog converting unit for converting a digital signal modulated signal by said modulating unit into an analog signal.

18. A modem signal transmitting/receiving method for a modem signal transmitting/receiving system which includes a modem signal transmitter having a modem transmitting unit and a modem signal receiver having a modem receiving unit connected to said modem transmitting unit via a transmission line; the method comprising the steps of:

converting an analog signal into a digital signal in said modem signal transmitter;

demodulating the converted signal into a demodulated signal in said modem signal transmitter with a predetermined carrier frequency signal;

converting a sampling rate into a symbol rate for the demodulated signal in said modem signal transmitter;

deciding by said modem signal transmitter a coordinate on a two-dimensional plane after conversion of said demodulated signal, receiving by said modem transmitting unit a decision result as digital data, time-divisionally multiplexing by said modem transmitting unit digital data with another digital signal and then transmitting the result, and separating by said modem receiving unit said another digital signal from the signal having information including a coordinate decision; and converting by said modem signal receiver a symbol rate into a sampling rate for a signal having information having said coordinate decision from said modem receiving unit and then modulating a result with said predetermined carrier frequency signal.

* * * * *